April 23, 1946.  R. H. HOBROCK  2,398,937
METHOD OF WELDING TUBE
Filed Jan. 3, 1944
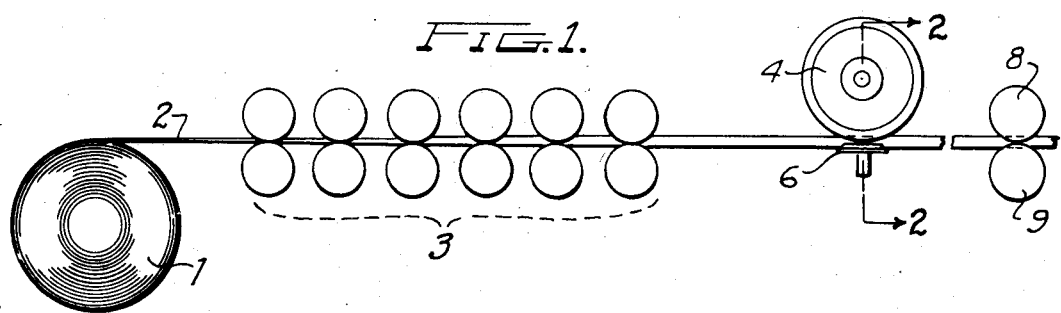
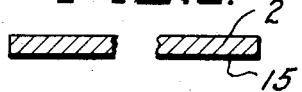
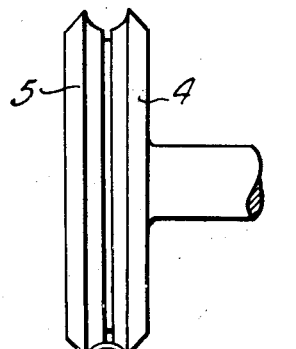
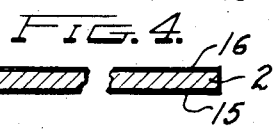
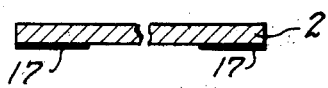
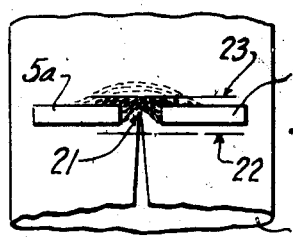
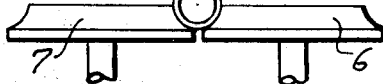
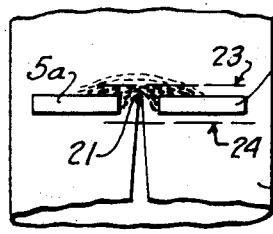
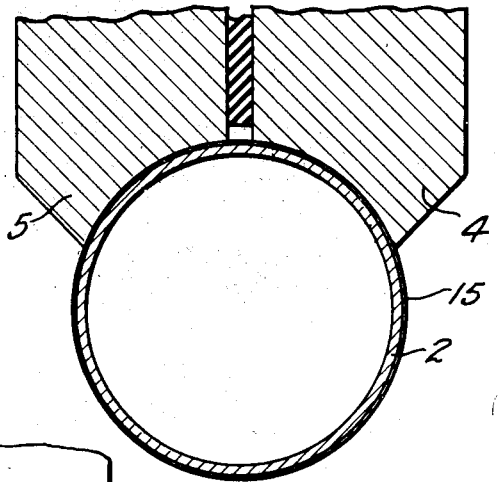
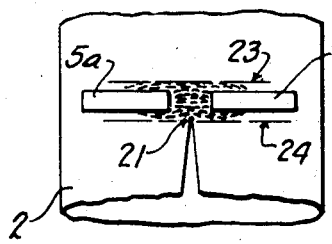
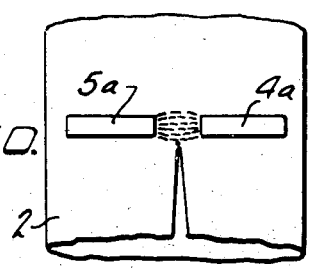
INVENTOR.
Raymond H. Hobrock
BY Barnes, Kisselle, Laughlin & Raisch
Attorneys Patented Apr. 23, 1946

2,398,937

UNITED STATES PATENT OFFICE 2,398,937

METHOD OF WELDING TUBE

Raymond H. Hobrock, Troy Township, Oakland County, Mich., assignor to Bundy Tubing Company, Detroit, Mich., a corporation of Michigan Application January 3, 1944, Serial No. 516,795

9 Claims. (Cl. 219—10)

This invention relates to welding, and particularly to welding by the electric resistance method. The invention is concerned especially with the making of tube or pipe where a seam therein is weld united.

As is well known by those versed in the art of tube welding, a strip of stock, usually steel, is moved lengthwise through a mill where the strip is fashioned into hollow cross sectional form with its opposite edges brought into opposing relationship, which hollow form is then passed through a welding throat where it is subjected to pressure so that the edges are forced together in abutting relationship and where electric current is passed through the metal and across the seam so that the edges are heated and weld united. The electric current employed is usually of relatively low voltage and relatively high amperage, and variables which otherwise may appear slight, cause relatively large variation in the amperage with the result that there are variations in the welded seam along the length of the tube. The principal place in the welding circuit where the resistance variation is great is at the contact between the electrodes and the tube. Another factor which results in variations in the welded seam is that the location or point where the edges are brought into abutting contact shifts lengthwise in the making of the tube. This shift may not be great from the standpoint of actual measurement but the point of initial contact has been found to move forward and backward within limits as the tube is drawn through the mill and welding throat. The location of the contact between the electrodes and the tube remains constant but as the apex or point of initial contact between the edges varies lengthwise of the tube, the apex may shift into and out of the main path current flow between the electrodes. This results in variations in the welded seam along the length of the tube.

The objects of the invention include the provision of an improved method of making welded tube in which current variations in the welding circuit are minimized and in which variations in the flow of current across the apex, otherwise caused by axial shift of the apex, are minimized with the result that a welded tube may be provided which has an improved welded seam with substantially uniform and consistent characteristics along its length. To these ends a method is provided wherein there is an improved electric contact between the electrodes and the moving work so that the variations in the resistance to the flow of electric current across the contact are leveled out. Also the current distribution or primary path of flow of current through the work from one electrode to another is widened axially of the tube so that the normal and unavoidable axial shift of the apex will not cause the apex to shift out of the path of current which is sufficient for producing a good weld. An improved tube thus results from the method, having a longitudinally extending welded seam of substantial uniform characteristics, thus minimizing and in some events eliminating faulty or weak spots in the seam. These and other objects of the invention will be readily understood by a consideration of the following detailed description in conjunction with the accompanying drawing.

Fig. 1 is a side elevational view diagrammatically depicting an apparatus for forming tube from strip stock and for welding the same.

Fig. 2 is an enlarged cross sectional view taken through the welding throat substantially on line 2—2 of Fig. 1 and showing electrodes and pressure rolls with the tube in place.

Figs. 3, 4 and 5 are cross sectional views of the strip stock which may be employed in carrying out the invention.

Fig. 6 is an enlarged cross sectional view showing electrodes applied to the tube.

Fig. 7 is a diagrammatic view illustrating the contact areas between the electrodes and the tube and showing the distribution or path of current flow through the metal adjacent the seam of the tube.

Fig. 8 is a view similar to Fig. 7 showing how the apex or point of initial contact between the edges has shifted axially in the direction of movement of the tube.

Fig. 9 is a diagrammatic view similar to 7 and 8 showing the apex shifted to a position somewhat in advance of the contact areas between the electrodes and the tubes.

Fig. 10 is a view illustrating the shifting of the apex so that it lies out of the path of concentrated flow of current between the electrodes.

At the outset it may be pointed out that the invention is applicable to the welding of a seam in a tube both by alternating current and by direct current. For convenience, the work is hereinafter termed "tube" and this term is to be construed to mean tube or pipe of any size regardless of how these terms may be distinguished in the trade. As an example of the conditions with which the invention deals, it may be pointed out that in some tube welding the voltage employed in the welding circuit is as low as from 1¼ to 4 volts, whereas the amperage may be in the vicinity of 60,000 or 70,000 amperes. This is an example only and may vary with different machines and different materials in the work and with different characteristics and strength and perfection desired in the finished article.

As shown in Fig. 1 the strip stock is disposed in a coil 1, the strip being shown at 2 and this strip is moved lengthwise through a tube mill generally shown at 3 having a number of tube forming rollers or devices for fashioning the strip into the hollow cross sectional form. With the strip thus formed it passes through a welding throat which may comprise electrodes 4 and 5 and pressure rolls 6 and 7 as shown in Fig. 2. The edges of the strip are brought into abutting engagement under pressure at the welding throat and current passes across the same between the electrodes whereby the metal is heated to welding temperature and thus united. The strip may be pulled by driven pulling rolls 8 and 9, and indeed some or all of the rolls in the mill 3 may be driven to aid in propelling the strip lengthwise. The illustration in Fig. 1 is largely diagrammatic and makes no particular effort to display structural features of the tube mill or the welding throat or pulling rolls, as tube making machines of this general type are well-known to those versed in the art.

The method comprises a treatment of the strip stock to accomplish improvements in the method and particularly the improvements relating to the contact resistance between the electrodes and the work and the current distribution in the path or flow of current between the electrodes. To this end the strip is provided with a coating or plating on its surfaces or on some of its surfaces so that the electrodes make contact with this coating or plating. Fig. 3 illustrates a diagrammatic cross section through strip 2 with a coating 15 on one side thereof. Fig. 4 shows the strip with a coating or plating 15 on one side and coating or plating 16 on the opposite side. Fig. 5 illustrates a strip with narrow bands of coating or plating as shown at 17. It wil be observed by references to Figs. 2 and 6 that the electrodes 4 and 5 contact the tube only in relatively narrow zones on opposite sides of the abutting edges and accordingly narrow bands of coating or plating as shown in Fig. 2 may suffice. However, from a practical standpoint it may be more feasible or even necessary to coat one or perhaps both sides of the strip as shown in Figs. 3 and 4.

This coating which is placed upon the strip is of a metal which preferably has high electrical conducting qualities and which is also of such a metal and kind of coating as to maintain substantially constant contact resistance with the electrode material in spite of the usual fluctuations of electrode pressures and other mechanical variables which are encountered in these welding methods. The electrodes 4 and 5 are quite commonly of copper or a cuprous metal. Accordingly, if the coating, and the use of the term coating is to include any covering or plating, be of copper or cuprous metal then a copper to copper contact between the electrodes and the tube is accomplished. With steel tubes the contact heretofore has been between cuprous electrodes and steel. The change in contact resistance is likely to be great especially in the case of certain alloy steels, such as those containing chromium or molybdenum and which form a thin but tightly adherent alloy film on the surface of the steel. Such a coating properly applied replaces adherent oxid or other coatings normally found on steels, especially on alloy steels. Other coating metals may be employed, however, which have electrical properties which are high enough for the purpose and which present a good contact with the electrodes, as for example, silver, or gold. In this manner variations in the resistance to the flow of current in the welding circuit across the contact between the work and the electrodes is minimized, resulting in a more uniform amperage in the welding circuit of which the abutting edges to be welded are a part.

The plating or coating may be applied to the base strip in different ways but it is important that the plating or coating be quite uniformly bonded to the base strip to thus provide efficient and substantially uniform electrical conducting characteristics between the plating or coating and the base strip. The plating or coating may be electro-deposited on the base strip. After the electro-deposition, the coated strip may be heat treated to strengthen the bond between the coating or plating and the base strip. The coating metal, however, may be applied by a hot process, as for example by subjecting the base strip to a bath of the melted plating or coating metal. An example of another hot process is that of mixing a powder of the plating or coating metal with a suitable carrier to provide a paste like mixture which may be spread on the surface of the base strip and then subjected to a heat treatment to melt the powder and thus cause the same to fuse into the form of a coating or plating. This heating step may be carried out in a reducing atmosphere. It may be necessary in some cases to pickle, etch, sand blast, or otherwise prepare the surface of the strip before the coating is applied. The coating metal may also be applied to the strip stock or other desired regions thereof by metal spraying methods where the metal is sprayed on a properly prepared surface. Such methods are known to those versed in the art. Since the coating or plating is primarily for electrical contact with the electrodes, no particular thickness is required. Indeed a thin coating or plating is preferred so that there will be no excess metal which will run into the seam when the coating or plating adjacent the abutting edges is melted. As an example, the coating may approximate .075 ounce of coating material per square foot of coated stock. In general it is undesirable to allow any of the coating metal on the edges of the strip which abut and where the weld is to be made because such coating metal may alloy with the strip metal and give undesirable characteristics to the weld, or it may cause undesirable burning or sparking during the welding operation. If, in the process of applying the coating to the strip the edges of the strip become coated, such edge coating should preferably be removed. This may be done by cutting or grinding tools before the welding is done. If the coating is applied to wide strips which are subsequently cut or slit to the desired widths the removal of coating metal at the cut or slit edges may not be required.

The conducting properties of the coating serve also to provide an improved current distribution between the electrodes as diagrammatically depicted in Figs. 7 to 9 inclusive. In Fig. 7 the contact area between the work and the electrodes are illustrated at 4a and 5a. Theoretically this contact is but a line but due to the pressure involved the area spreads axially of the tube somewhat as illustrated. The path of the flow of the welding current between the electrodes is illustrated by the flow lines in Fig. 7 and it will be observed that this path is somewhat elongated axially relative to the actual contact areas. If the coating metal has a greater electrical conductivity than the metal of the strip the principal current flow will be elongated axially. Fig. 7 also shows the edges of the tube as they come together in the welding throat and meet initially in the abutting relationship at the apex 21. As shown in Fig. 7, the apex is positioned between the contact areas and this condition promotes a good weld. However, if the apex varies either fore or aft, a good weld may still be made provided the apex remains within the region of a heavy current flow. For example, so long as the apex does not shift beyond the point where there is an adequate current at the apex for welding purposes, as may be exemplified by the lines 22 and 23, a good weld may be obtained. As mentioned above the actual position of this apex shifts and may oscillate back and forth axially of the tube as the strip and tube are pulled lengthwise. This may be due to the unavoidable tolerances in the thickness of the stock and the width of the stock. In Fig. 8 for example, the apex has shifted forwardly beyond the actual area of contact between the electrodes and the tube but it is still within the permissible limits indicated by the line 23. In Fig. 9, the apex has shifted rearly but it still lies in the path of adequate welding current. To exemplify the matter further, Fig. 10 illustrates the current flow across the electrodes in the absence of a conductive coating and it will be seen that the path of the current, adequate for welding, is more narrow. Accordingly, when the apex positioned as shown, the welding current is applied to the edges after the edges have come together at the apex. Should the apex shift forwardly to a position as indicated at Fig. 8, the welding current is applied to the sides of the tube before the edges are in contact, with the result that a large proportion of the current will pass around through the body of the tube and not across the seam. Accordingly, with a conductive coating, and preferably a relatively high conductive coating, uniform characteristics throughout the length of the seam may be obtained even in the presence of this shift of the apex.

It is within the invention to apply a coating of metal to the strip stock which does not have greater electrical conductivity than the material of the strip. Such a metal coating may provide a substantially uniform contact resistance between the welding electrodes and the strip thus providing the improvements which result from the more uniform condition in the welding circuit. However, when the coating metal has greater electrical conductivity than the strip stock a longitudinal distribution of current flow between the electrodes is achieved thus providing the additional improved results described above.

The coating material is not intended to perform any function as a bonding medium or the like in the finished welded seam. The coating does not cover the abutted edges and does not penetrate into the seam to an extent to substantially affect the butt weld. It may be that the current distribution between the electrodes may result in some power losses resulting in a lowering of the electrical efficiency of the welding process from the standpoint of the power consumed per unit length of tube welded, but this is inconsequential in view of the obtaining of more uniform weld characteristics throughout the length of the seam which results in lowering the percentage of tube which is wasted or rejected because of faulty weld conditions at one or more points throughout its length. For the purposes of brevity and clearness, the term "coating" is used in the claims to describe the coating or plating, the term to be construed to include coverings which may either be technically called "plating" or "coating."

I claim:

1. In the method of making tube wherein a strip of steel stock is fashioned into hollow cross sectional tube form and its edges are brought into contacting relationship in a seam and weld united as the formed tube moves through a welding throat by the passage of electrical current across the seam between electrodes contacting the moving formed tube on opposite sides of the seam; the steps of bonding a coating of metal on the steel stock which coating has electrical conducting properties higher than that of the steel stock and contacting the coated surfaces of the formed tube with the electrodes.

2. In the method of making tube wherein a strip of ferrous metal stock is fashioned into hollow cross sectional tube form and its edges are brought into contacting relationship in a seam and weld united as the formed tube moves through a welding throat by the passage of electrical current across the seam between electrodes contacting the moving formed tube on opposite sides of the seam; the steps of bonding a coating of metal on the ferrous metal stock which coating has electrical conducting properties higher than that of the ferrous metal stock and contacting the coated surfaces of the formed tube with the electrodes.

3. In the method of making tube wherein a strip of ferrous metal stock is fashioned into hollow cross sectional tube form and its edges are brought into contacting relationship in a seam and weld united as the formed tube moves through a welding throat by the passage of electrical current across the seam between electrodes contacting the moving formed tube on opposite sides of the seam; the steps of bonding a coating of metal on the ferrous metal stock with a substantially uniform bond between the coating and the ferrous stock and which coating has electrical conducting properties higher than that of the ferrous stock and contacting the coated surfaces of the formed tube with the electrodes.

4. In the method of making tube wherein a strip of ferrous metal stock is fashioned into hollow cross sectional tube form, and its edges are brought into contacting relationship in a seam and weld united as the formed tube moves through a welding throat by the passage of electrical current across the seam between electrodes contacting the formed tube on opposite sides of the seam; the steps of bonding a coating of metal on the strip stock which coating has the property of maintaining a substantially constant contact resistance between the coating and the electrodes and contacting the coated surfaces of the formed tube with the electrodes.

5. In the method of making tube wherein a strip of metal stock is fashioned into hollow cross sectional tube form, and its edges are brought into contacting relationship in a seam and weld united as the formed tube moves through a welding throat by the passage of electrical current across the seam between electrodes contacting the formed tube on opposite sides of the seam; the steps of bonding a coating of metal on the strip stock which coating has the property of maintaining a contact resistance between itself and the electrodes which is relatively uniform as compared with the contact resistance between the strip metal stock and electrodes and contacting the coated surfaces of the formed tube with the electrodes.

6. In the method of making tube wherein a strip of metal stock is fashioned into hollow cross sectional tube form to provide the tube body and its edges are brought into contacting relationship in a seam and weld united as the formed tube moves through a welding throat by the passage of electrical current across the seam between electrodes contacting the formed tube on opposite sides of the seam; the steps of bonding a coating of metal on the strip stock which coating has the property of maintaining a substantially constant contact resistance between the coating and the electrodes and contacting the coated surfaces of the formed tube with the electrodes.

7. In the method of making tube wherein a strip of metal stock is fashioned into hollow cross sectional tube form and its edges are brought into contacting relationship in a seam and weld united as the formed tube moves through a welding throat by the passage of electrical current across the seam between electrodes contacting the moving formed tube on opposite sides of the seam; the steps of bonding a coating of metal on the said stock and which coating is of the same type of metal as the metal of which the electrodes are comprised and contacting the coated surfaces of the formed tube with the electrodes.

8. In the method of making tube wherein a strip of ferrous metal stock is fashioned into hollow cross sectional tube form and its edges are brought into contacting relationship in a seam and weld united as the formed tube moves through a welding throat by the passage of electrical current across the seam between cuprous electrodes contacting the moving formed tube on opposite sides of the seam; the steps of bonding a coating of cuprous metal on the ferrous stock and contacting the coated surfaces of the formed tube with the electrodes.

9. In the method of making tube wherein strip metal stock is fashioned into hollow cross sectional tube form and its edges are brought into abutting relationship in a seam and weld united as the formed tube moves through a welding throat by the passage of electrical current across the seam between electrodes contacting the moving formed tube on opposite sides of the seam; the steps bonding a coating of metal on at least some of the side surfaces of the metal stock and which coating is of the same type of metal as that of which the electrodes are comprised and contacting the coated surfaces of the formed tube with the electrodes.

RAYMOND H. HOBROCK.